(12) United States Patent (10) Patent No.: US 8,827,205 B2
Mason (45) Date of Patent: Sep. 9, 2014

(54) PNEUMATIC BLOW-DOWN ACTUATOR

(75) Inventor: Garth L. Mason, Springville, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 453 days.

(21) Appl. No.: 12/463,207

(22) Filed: May 8, 2009

(65) Prior Publication Data

US 2010/0282901 A1    Nov. 11, 2010

(51) Int. Cl.
B64C 25/58 (2006.01)
B64C 25/30 (2006.01)
B64C 25/18 (2006.01)
B64C 25/22 (2006.01)

(52) U.S. Cl.
CPC ............... *B64C 25/18* (2013.01); *B64C 25/30* (2013.01); *B64C 25/22* (2013.01)
USPC ................................ 244/104 FP; 244/102 R

(58) Field of Classification Search
USPC ...... 244/99.4, 99.5, 102 A, 104 FP, 107, 228, 244/226
See application file for complete search history.

(56) References Cited

U.S. PATENT DOCUMENTS

| | | | |
|---|---|---|---|
| 2,387,713 A | 10/1945 | Bradford | |
| 2,620,683 A * | 12/1952 | Geyer | 74/665 Q |
| 2,735,634 A * | 2/1956 | Fosness | 244/104 FP |
| 5,121,647 A | 6/1992 | Teramachi | |
| 5,175,456 A | 12/1992 | Neff et al. | |
| 5,184,465 A | 2/1993 | Howard et al. | |
| 5,270,625 A | 12/1993 | Neff | |
| 5,360,185 A | 11/1994 | Derrien | |
| 5,446,323 A | 8/1995 | Neff et al. | |
| 5,460,340 A * | 10/1995 | White | 244/102 A |
| 6,076,875 A | 6/2000 | Neff et al. | |
| 6,345,564 B1 * | 2/2002 | Kilner et al. | 91/169 |
| 7,458,542 B2 | 12/2008 | Chow et al. | |
| 2006/0228236 A1 * | 10/2006 | Krisher | 417/415 |
| 2007/0194738 A1 * | 8/2007 | Hirai | 318/480 |
| 2009/0050736 A1 * | 2/2009 | Bennett et al. | 244/102 R |

* cited by examiner

*Primary Examiner* — Tien Dinh
*Assistant Examiner* — Keith L Dixon
(74) *Attorney, Agent, or Firm* — Nydegger & Associates

(57) ABSTRACT

An electromechanical linear actuator includes a pneumomechanical back-up system to ensure extension of retractable landing gear for landing an aircraft. Structurally, the linear actuator includes a stator forming a channel for receiving a ball screw. Further, the actuator includes a ball screw housing forming a chamber for receiving the ball screw. Specifically, the ball screw and the housing are in threaded engagement to translate rotation of the ball screw into axial extension of the housing. To power electromechanical extension of the actuator, the ball screw is selectively engaged to a motor with a gear train. Importantly, fluid communication between the ball screw housing and a pressurized fluid is selectively provided by a valve. If electromechanical extension of the actuator fails, the gear train is disconnected from the ball screw and the pressurized fluid is introduced into the chamber to drive pneumomechanical extension.

20 Claims, 3 Drawing Sheets

PNEUMATIC BLOW-DOWN ACTUATOR

FIELD OF THE INVENTION

The present invention pertains generally to aircraft landing gear. More particularly, the present invention pertains to a linear actuator that is provided with a redundant system for powering extension. The present invention is particularly, but not exclusively, useful as an electromechanical and pneumomechanical linear actuator for deploying landing gear from an aircraft.

BACKGROUND OF THE INVENTION

Conventionally, fixed wing aircraft employ one of two types of landing gear: fixed landing gear and retractable landing gear. Importantly, retractable landing gear provides reduced drag on the aircraft during flight, resulting in higher speed and better fuel efficiency. On the other hand, a retractable landing gear also introduces issues of reliability. Specifically, deployment of the landing gear before touchdown is an operational necessity and is of utmost concern to the pilot.

Typically, retraction and extension of a retractable landing gear is performed by an electromechanical device, such as a linear actuator. While electromechanical linear actuators are relatively simple and reliable, they can fail. When such a failure occurs, the pilot may have to land on the belly of the aircraft fuselage; a dangerous and expensive consequence.

In light of the above, it is an object of the present invention to provide a linear actuator having an electromechanical drive and a back-up pneumomechanical drive. It is another object of the present invention to provide a pneumatic redundant system for deploying landing gear. Yet another object of the present invention is to provide a pneumatic blow-down actuator which is easy to use, relatively simple to implement, and comparatively cost effective.

SUMMARY OF THE INVENTION

The present invention is directed to a mechanism for ensuring that the landing gear of an aircraft is fully deployed and locked for landing. Specifically, the present invention provides a linear actuator that is interconnected between the aircraft fuselage and the landing gear. As a result, extension of the linear actuator causes the landing gear to be moved from a stowed configuration, where the landing gear typically is held within the wing, to a deployed configuration where it extends from the wing for landing. For movement of the linear actuator, the present invention is provided with an electromechanical drive system. Importantly, the present invention also includes a pneumomechanical back-up system to drive the linear actuator to deploy the landing gear in case the electromechanical drive system fails.

Structurally, the linear actuator comprises three main components: a stator that forms a channel defining an axis, a sleeve-like ball screw housing received in the channel and forming a chamber, and a ball screw received by the channel and the chamber. Importantly, these three components are interconnected to drive the linear actuator electromechanically. Specifically, the ball screw is mounted within the stator's channel for rotation about the axis. Further, the ball screw is threadedly engaged with the chamber of the ball screw housing. As a result, rotation of the ball screw is translated into linear movement of the ball screw housing along the direction of the axis.

In the invention, a motor is housed in the stator to power the primary system for driving the actuator. Further, the motor is interconnected to the ball screw via a gear train. When the gear train is driven by the motor, it causes the ball screw to rotate about the axis in a selected direction. As a result, the ball screw housing moves linearly along the axis, either extending from or withdrawing into the channel depending on the selected direction of rotation of the ball screw.

In order to ensure that the landing gear is deployed, despite a failure of the electromechanical system, the linear actuator is provided with a pneumomechanical back-up system. Further the linear actuator includes a clutch for disconnecting the gear train from the motor to allow the ball screw to rotate freely. For the pneumatic system, a port is positioned on the chamber of the ball screw housing to provide fluid communication between the chamber and a pressurized fluid such as nitrogen. Further, a valve is provided to selectively open and close the fluid communication between the port and the pressurized fluid. As a result, introduction of the pressurized fluid into the chamber can be regulated.

In order to trigger the back-up system in case of an electromechanical failure, a control is provided for operation by the pilot. Specifically, the control is connected to the clutch and the valve. With these connections, the pilot can activate the clutch to disconnect the gear train from the motor and activate the valve to introduce the pressurized fluid into the chamber. As the pressurized fluid enters the chamber, it exerts an axial force on the ball screw. As a result, the ball screw is back-driven into rotation, causing the ball screw housing to extend axially to deploy the landing gear.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
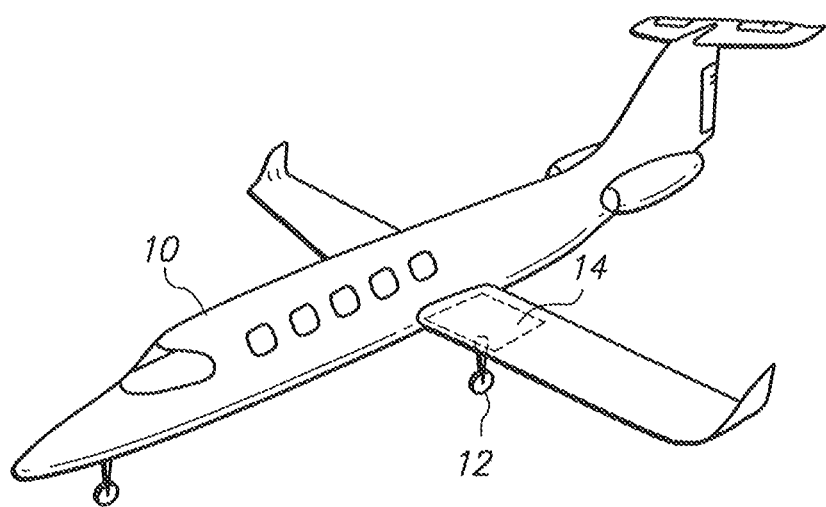
FIG. 1 is a perspective view of an aircraft with its landing gear in a deployed configuration.
Figure 2A:
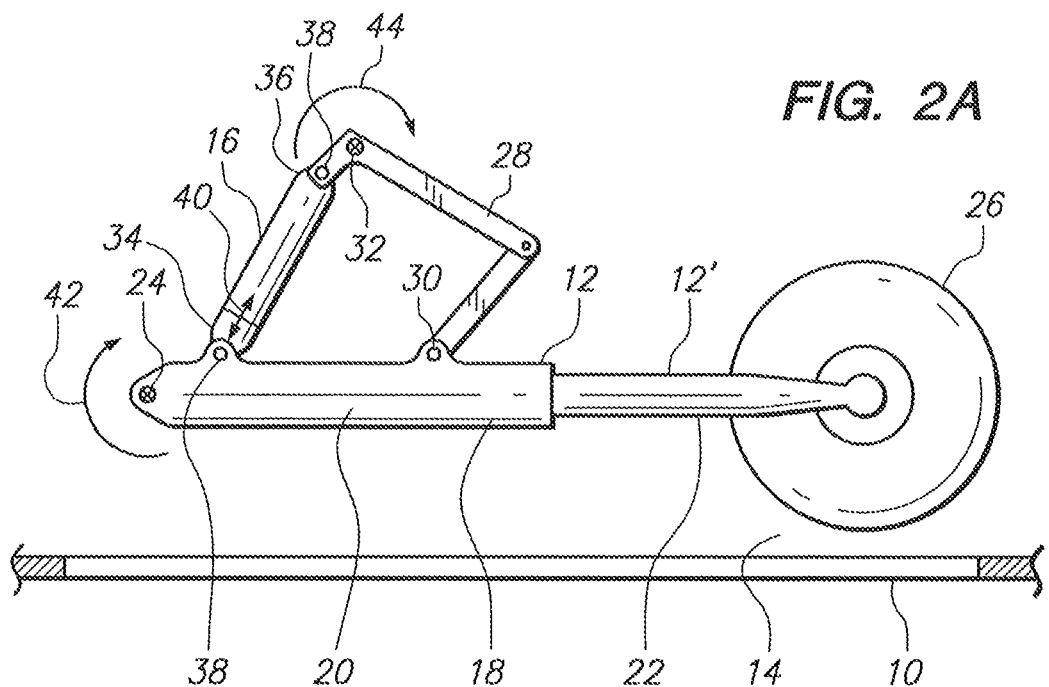
FIG. 2A is a schematic view of the landing gear of the aircraft of FIG. 1, shown in a stowed configuration.
Figure 2B:
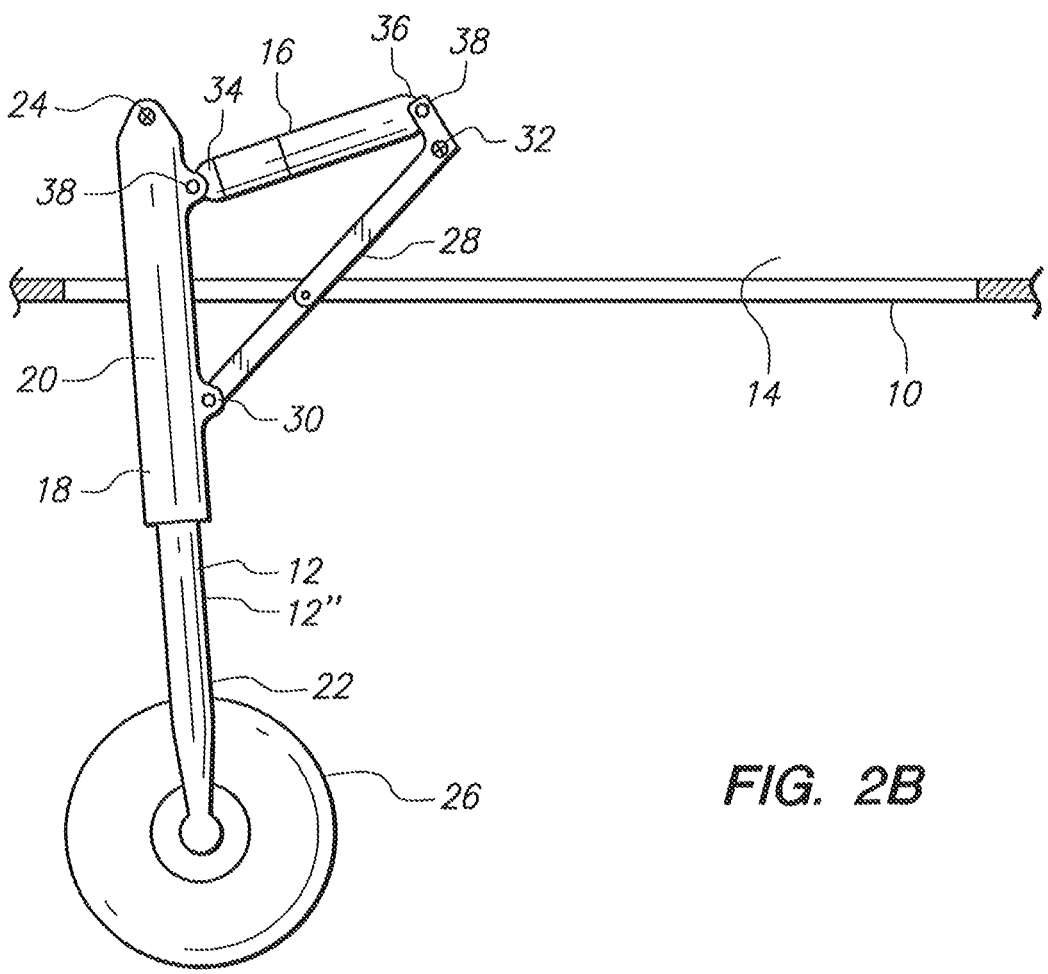
FIG. 2B is a schematic view of the landing gear of FIG. 2A, shown in the deployed configuration.

Referring initially to FIG. 1, an aircraft 10 is shown having retractable landing gear 12 extending from its gear bay 14 for landing. Referring to FIGS. 2A and 2B, an electromechanical and pneumomechanical linear actuator for extending the landing gear 12 is shown and designated 16. As shown in FIG. 2A, the landing gear 12 is in its stowed configuration 12' within the gear bay 14. In FIG. 2B, the linear actuator 16 has extended to drive the landing gear 12 to its deployed configuration 12" for landing.

In FIGS. 2A and 2B, exemplary landing gear 12 is illustrated to include a folding strut 18 formed with an upper end 20 and a lower end 22. Further, the upper end 20 is pivotably mounted to the gear bay 14 at a pivot 24 and the lower end 22 is mounted to a wheel assembly 26. Also, the folding strut 18 includes a hinged arm 28 that is pivotably connected both to the upper end 20 at pivot 30 and to the gear bay 14 at pivot 32. Further, the linear actuator 16 is shown to have two ends 34, 36 which include spherical rod ends 38 for connection between the upper end 20 and the arm 28.

In FIG. 2A, the linear actuator 16 is retracted and the landing gear 12 is in its stowed configuration 12'. In FIG. 2B, the linear actuator 16 is extended and the landing gear 12 is in its deployed configuration 12". By cross-referencing FIGS. 2A and 2B, it may be seen that extension of the linear actuator 16 in the direction of arrows 40 causes the landing gear components to rotate about pivots 24, 32 in the direction of arrows 42 and 44, respectively. As a result of the full extension of the linear actuator 16, the landing gear 12 moves from the configuration 12' shown in FIG. 2A to the configuration 12" shown in FIG. 2B.

Figure 3:
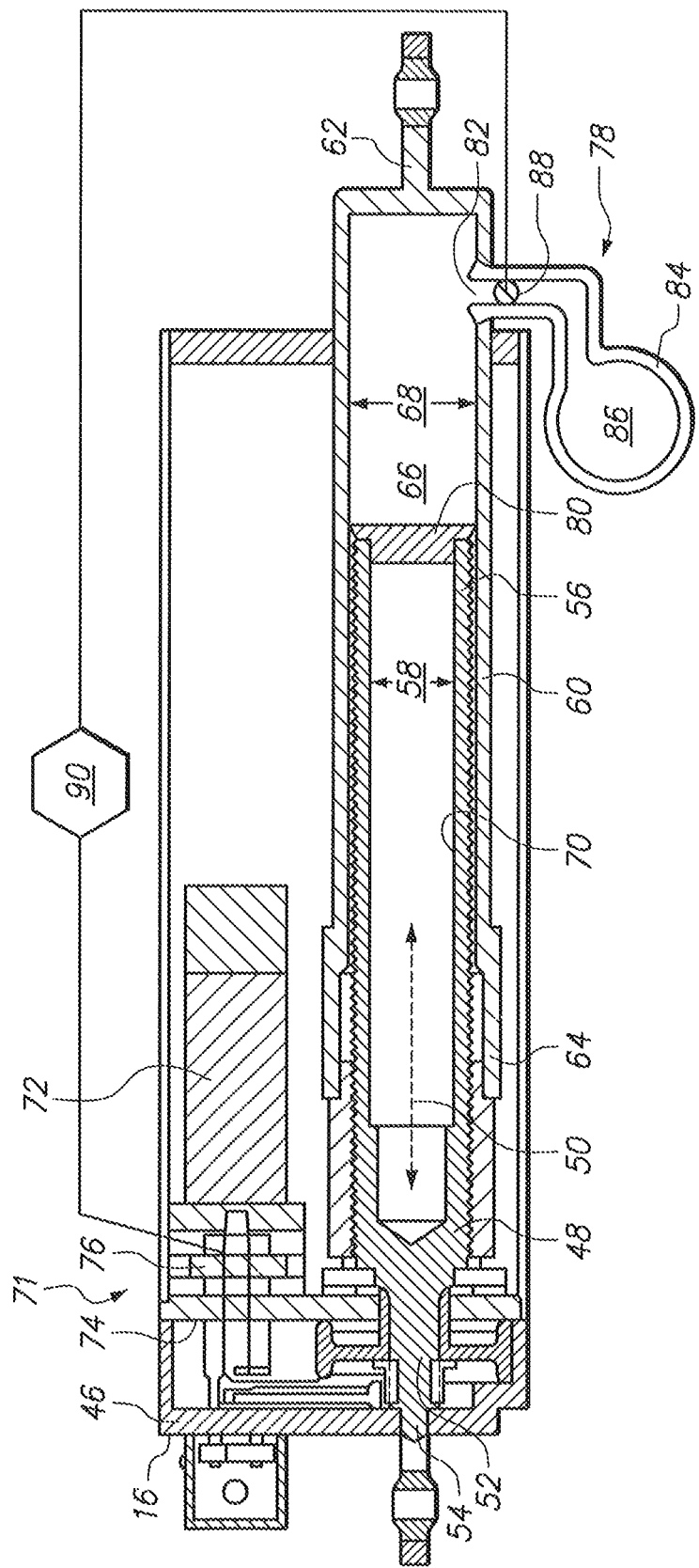
FIG. 3 is a cross sectional view of the linear actuator shown in FIGS. 2A and 2B, with the actuator retracted.

Referring now to FIG. 3, the operation of the linear actuator 16 may be understood. As shown, the linear actuator 16 includes a stator 46 that forms a channel 48 defining an axis 50. Further, a ball screw 52 is positioned in the channel 48 for rotation about the axis 50. As shown, the ball screw 52 has a distal end 54 and an open proximal end 56 and forms a cavity 58. Importantly, while the ball screw 52 is able to rotate about the axis 50, it does not move axially within the channel 48.

As shown in FIG. 3, the linear actuator 16 further includes a ball screw housing 60. Structurally, the ball screw housing 60 has an end 62, an end 64, and forms a chamber 66. Further, the proximal end 56 of the ball screw 52 is received within the chamber 66. Importantly, the ball screw 52 and ball screw housing 60 are threadedly engaged to translate rotation of the ball screw 52 into axial movement of the ball screw housing 60. For purposes of the present invention, the chamber 66 may be considered to include a proximal portion 68 and a distal portion 70, with the distal portion 70 receiving the ball screw 52.

In order to rotate the ball screw 52 to axially extend the ball screw housing 60, the linear actuator 16 includes an electromechanical system 71 that utilizes a motor 72. Further, the motor 72 is selectively engageable with the ball screw 52 via a gear train 74. As shown, the linear actuator 16 provides a clutch 76 for selectively disconnecting the gear train 74 from the motor 72.

As a back-up or redundant system generally designated 78, the linear actuator 16 is provided with pneumatic components. Specifically, the linear actuator 16 includes a cap 80 that seals the open proximal end 56 of the ball screw 52. As a result, the volume of the proximal portion 68 of the chamber 66 is bound by the cap 80 and the ball screw housing 60. Also, the linear actuator 16 includes a port 82 formed on the proximal portion 68 of the chamber 66. As shown, the port 82 is in fluid communication with a container 84 holding a pressurized fluid 86. For example, the pressurized fluid 86 may be either a gas, such as nitrogen, or an incompressible liquid, such as hydraulic fluid. Further, the pneumatic system 78 includes a valve 88 for selectively introducing the pressurized fluid 86 into the proximal portion 68 of the chamber 66. Importantly, the system 78 provides a control 90 for activating the clutch 76 and the valve 88 concertedly, as is discussed below.

During flight, the landing gear 12 is housed in the gear bay 14 of the aircraft 10 in its stowed configuration. As the aircraft 10 is brought down for landing, the motor 72 is activated to extend the linear actuator 16 to move the landing gear 12 to its deployed configuration 12". If the electromechanical system 71 fails, then the pneumomechanical system 78 is utilized. Specifically, the pilot is alerted that the landing gear 12 is not in its deployed configuration 12" despite the action of the electromechanical system 71. Thereafter, the pilot utilizes the control 90 to activate the clutch 76 to disconnect the ball screw 52 from the gear train 74. Further, the control 90 activates the valve 88. As a result, the pressurized fluid 86 enters the proximal portion 68 of the chamber 66 and exerts pressure on the ball screw 52. Due to this pressure, the ball screw 52 is back-driven into rotating about the axis 50, resulting in the axial extension of the ball screw housing 60. In this manner, the landing gear 12 is moved to its deployed configuration 12" despite the failure of the electromechanical system 71.

While the particular Pneumatic Blow-down Actuator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims. Further, it is noted that the structure of the landing gear is not pertinent to the claimed invention, but is illustrated and discussed to provide background for the operation of the actuator.

What is claimed is:

1. An electromechanical and pneumomechanical linear actuator interconnected to a folding strut for moving retractable landing gear from a stowed configuration to a deployed configuration for landing which comprises:
   a stator forming a channel defining an axis;
   a ball screw received in the channel for rotation about the axis;
   a ball screw housing for engagement with the ball screw to establish a chamber, the chamber being between a distal end of the ball screw and a proximal portion of the ball screw housing, and the ball screw housing having a distal portion for receiving the ball screw in threaded engagement therewith to translate rotation of the ball screw into axial movement of the ball screw housing relative to the ball screw;
   an electromechanical means for rotating the ball screw to extend the ball screw housing;
   a clutch for disconnecting the electromechanical rotating means from the ball screw housing;
   a port formed on the ball screw housing, the port positioned on the proximal portion of the chamber; and
   a valve for selectively providing fluid communication between a pressurized fluid and the port to introduce the pressurized fluid into the proximal portion of the chamber to drive the ball screw housing away from the stator to move the folding strut of the landing gear from the stowed configuration to the deployed configuration.

2. A linear actuator as recited in claim 1 wherein the ball screw has a distal end and an open proximal end and forms a cavity, and wherein the open proximal end is sealed with a cap to partially bound the proximal portion of the chamber in the ball screw housing.

3. A linear actuator as recited in claim 1 wherein the pressurized fluid is nitrogen.

4. A linear actuator as recited in claim 1 wherein the electromechanical means includes a motor and a gear train interconnected between the motor and the ball screw, and wherein the clutch disconnects the gear train from the ball screw to allow the pressurized fluid back-drive the ball screw to drive the ball screw housing away from the stator.

5. A linear actuator as recited in claim 1 wherein the clutch and the valve are activated when the electromechanical means fails.

6. A linear actuator as recited in claim 5 further comprising a control for activating the clutch and the valve.

7. A linear actuator as recited in claim 1 wherein the linear actuator has a first end and a second end, and wherein a spherical rod end is positioned at each end of the linear actuator for connection to the landing gear.

8. A linear actuator as recited in claim 7 wherein the spherical rod ends are mounted to the ball screw housing and the ball screw, respectively.

9. A backup system for extending retractable landing gear from a gear by in an aircraft for landing, wherein the landing gear includes (a) a folding strut moveable from a stowed configuration in which the folding strut is housed in the gear bay to a deployed configuration in which the folding strut is extended for landing, and (b) an electromechanical linear actuator connected to the folding strut to move the folding strut from the stowed configuration to the deployed configuration, the system comprising:

a pneumatic means for operating the linear actuator to move the folding strut from the stowed configuration to the deployed configuration, wherein the linear actuator includes a stator forming a channel defining an axis, a ball screw received in the channel for rotation about the axis, and a ball screw housing for engagement with the ball screw to establish a chamber, the chamber being between a distal end of the ball screw and a proximal portion of the ball screw housing and the ball screw housing having a distal portion for receiving the ball screw in threaded engagement therewith to translate rotation of the ball screw into axial movement of the ball screw housing relative to the ball screw, and wherein the pneumatic means includes a port formed on the ball screw housing, the port positioned on the proximal portion of the chamber in fluid communication with a pressurized fluid and a valve for selectively introducing the pressurized fluid to the proximal portion of the chamber to drive the ball screw housing away from the stator to move the folding strut of the landing gear from the stowed configuration to the deployed configuration.

10. A system as recited in claim 9 wherein the ball screw has a distal end and an open proximal end and forms a cavity, and wherein the system further comprises a cap for sealing the open proximal end to partially bound the proximal portion of the chamber in the ball screw housing.

11. A system as recited in claim 9 wherein the pressurized fluid is nitrogen.

12. A system as recited in claim 9 wherein the electromechanical linear actuator includes a motor and a gear train interconnected between the motor and the ball screw, and wherein the system further comprises a clutch for disconnecting the gear train from the ball screw to allow the pressurized fluid to back-drive the ball screw when driving the ball screw housing away from the stator.

13. A system as recited in claim 12 further comprising a control to activate the clutch and the valve when electromechanical extension of the ball screw housing fails.

14. A redundant system for deploying retractable landing gear from a gear bay in an aircraft for landing which comprises:

a folding strut moveable from a stowed configuration in which the folding strut is housed in the gear bay to a deployed configuration in which the folding strut is extended for landing the aircraft;

an electromechanical linear actuator connected to the folding strut to move the folding strut from the stowed configuration to the deployed configuration, wherein the electromechanical linear actuator includes a stator forming a channel defining an axis, a ball screw received in the channel for rotation about the axis, a ball screw housing for engagement with the ball screw to establish a chamber, the chamber being between a distal end of the ball screw and a proximal portion of the ball screw housing and the ball screw housing having a distal portion for receiving the ball screw, wherein the ball screw and ball screw housing are threadedly engaged to translate rotation of the ball screw into axial movement of the ball screw housing relative to the ball screw, and wherein the proximal portion of the chamber includes a port formed on the ball screw housing, in fluid communication with a pressurized fluid, and an electromechanical means for rotating the ball screw to extend the ball screw housing; and a means for selectively introducing the pressurized fluid into the proximal portion of the chamber to drive the ball screw housing away from the stator to move the folding strut of the landing gear from the stowed configuration to the deployed configuration.

15. A system as recited in claim 14 wherein the ball screw has a distal end and an open proximal end and forms a cavity, and wherein the open proximal end is sealed with a cap to partially bound the proximal portion of the chamber in the ball screw housing.

16. A system as recited in claim 14 wherein the pressurized fluid is nitrogen.

17. A system as recited in claim 14 wherein the electromechanical means includes a motor and a gear train interconnected between the motor and the ball screw, and wherein the system further comprises a clutch for disconnecting the gear train from the ball screw to allow the pressurized fluid back-drive the ball screw to drive the ball screw housing away from the stator.

18. A system as recited in claim 17 wherein the introducing means comprises a valve, and wherein the clutch and the valve are activated when the electromechanical means fails.

19. A system as recited in claim 18 further comprising a control for activating the clutch and the valve.

20. A system as recited in claim 19 wherein the folding strut includes an upper end mounted to the gear bay and a lower end, and wherein the system comprises a wheel assembly mounted to the lower end.

* * * * *